(12) United States Patent
Elko et al.

(10) Patent No.: US 8,838,910 B2
(45) Date of Patent: Sep. 16, 2014

(54) MULTI-PART AGGREGATED VARIABLE IN STRUCTURED EXTERNAL STORAGE

(75) Inventors: David A. Elko, Austin, TX (US); Ronen Grosman, Ontario (CA); Stewart L. Palmer, New York, NY (US); Adam J. Storm, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 1136 days.

(21) Appl. No.: 12/795,205

(22) Filed: Jun. 7, 2010

(65) Prior Publication Data

US 2011/0302375 A1 Dec. 8, 2011

(51) Int. Cl.
*G06F 12/00* (2006.01)
*G06F 17/30* (2006.01)

(52) U.S. Cl.
CPC .............................. *G06F 17/30348* (2013.01)
USPC ........................................ 711/147; 707/800

(58) Field of Classification Search
USPC ........................................ 711/147; 707/800
See application file for complete search history.

(56) References Cited

U.S. PATENT DOCUMENTS

| | | | |
|---|---|---|---|
| 5,455,946 A | 10/1995 | Mohan et al. | |
| 5,581,737 A | 12/1996 | Dahlen et al. | |
| 5,742,830 A | 4/1998 | Elko et al. | |
| 5,822,562 A | 10/1998 | Dahlen et al. | |
| 6,219,772 B1 | 4/2001 | Gadangi et al. | |
| 6,237,000 B1 | 5/2001 | Dahlen et al. | |
| 6,249,852 B1 | 6/2001 | Benayon et al. | |
| 6,449,734 B1 | 9/2002 | Shrivastava et al. | |
| 6,584,554 B1 | 6/2003 | Dahlen et al. | |
| 6,931,507 B2 | 8/2005 | Kim et al. | |
| 7,542,986 B2 | 6/2009 | Lubbers et al. | |
| 7,904,668 B2 * | 3/2011 | Shavit et al. | 711/152 |
| 2005/0138375 A1 | 6/2005 | Sadjadi | |
| 2008/0016275 A1 | 1/2008 | Sebastian et al. | |

(Continued)

FOREIGN PATENT DOCUMENTS

JP  2005166052 A2  6/2005

OTHER PUBLICATIONS

Nawrocki, Jerzy R. et al., "Fixed-Sized Blocks Optimization", Information Processing Letters (Inf Process Lett), 1988.12.01, CODEN: IFPLA, ISSN: 0020-0190, Item Identifier (DOI): 10.1016/0020-0190(88)90055-5, 1988, 29/4, pp. 165-169.

(Continued)

*Primary Examiner* — Kalpit Parikh
(74) *Attorney, Agent, or Firm* — Stephen R. Tkacs; Stephen J. Walder, Jr.; Preston J. Young

(57) ABSTRACT

A mechanism is provided for multi-part aggregated variables in structured external storage. The shared external storage provides a serialized, aggregated structure update capability. The shared external storage identifies each local value for which a group value is needed by name. Each time a member writes out its value, the member specifies the name of the object, the member's current value, and the type of aggregate function to apply (e.g., minimum, maximum, etc.). The structured external storage in one atomic operation updates the member's value, recalculates the aggregate of all of the individual values, and returns the aggregate to the member. The advantage of this approach is that it requires only one write operation to the structured external storage. The update operation does not require locking, because the operation is atomic.

20 Claims, 6 Drawing Sheets

(56) References Cited

U.S. PATENT DOCUMENTS

| | | |
|---|---|---|
| 2008/0229048 A1 | 9/2008 | Murase et al. |
| 2008/0288646 A1 | 11/2008 | Hasha et al. |
| 2009/0125680 A1 | 5/2009 | Ninose et al. |
| 2009/0132868 A1 | 5/2009 | Chkodrov et al. |
| 2009/0216989 A1 | 8/2009 | Kato et al. |
| 2009/0249018 A1 | 10/2009 | Nojima et al. |
| 2009/0254731 A1 | 10/2009 | Maheshwari et al. |
| 2010/0205374 A1 | 8/2010 | Meka et al. |
| 2011/0302377 A1 | 12/2011 | Elko et al. |

OTHER PUBLICATIONS

Office Action mailed Apr. 23, 2012 for U.S. Appl. No. 12/795,276; 15 pages.
Response to Office Action filed Jul. 20, 2012, U.S. Appl. No. 12/795,276, 9 pages.
USPTO U.S. Appl. No. 12/795,276, 1 page.
Interview Summary mailed Jul. 23, 2012, U.S. Appl. No. 12/795,276, 3 pages.
Notice of Allowance mailed Aug. 13, 2012, U.S. Appl. No. 12/795,276, 12 pages.

\* cited by examiner

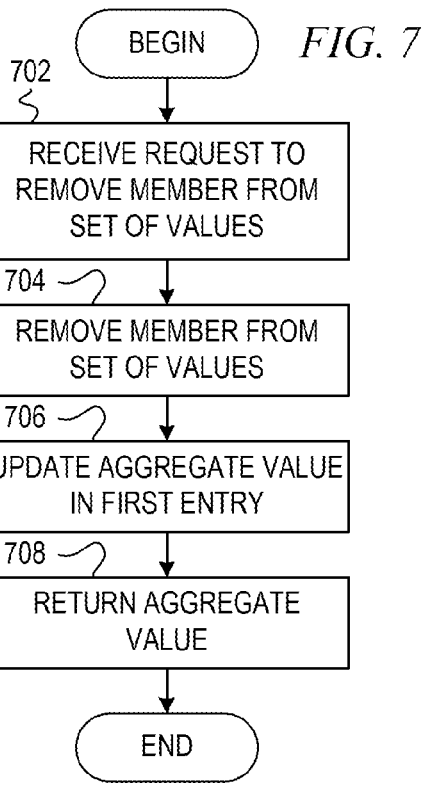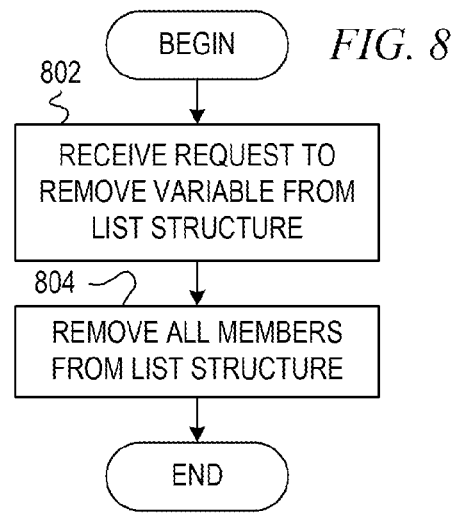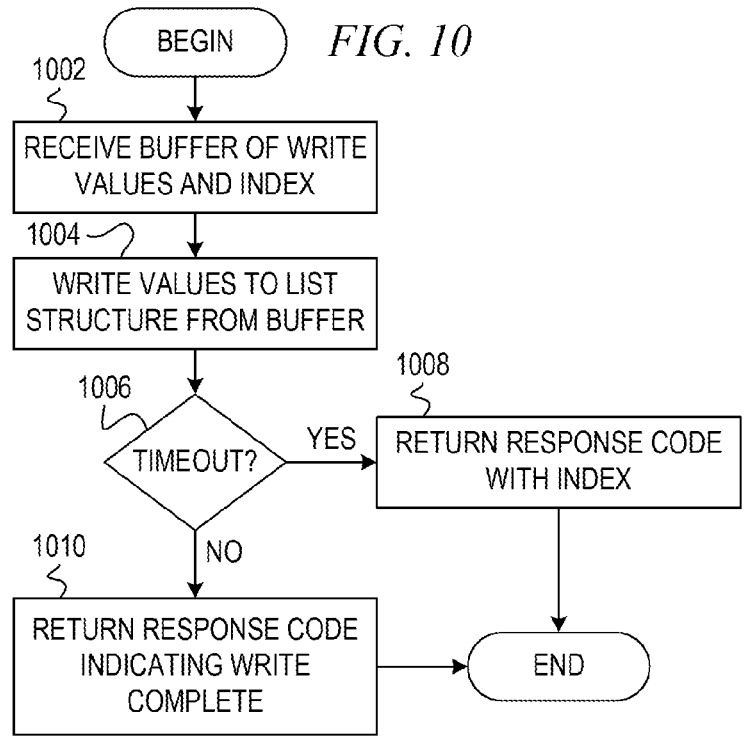

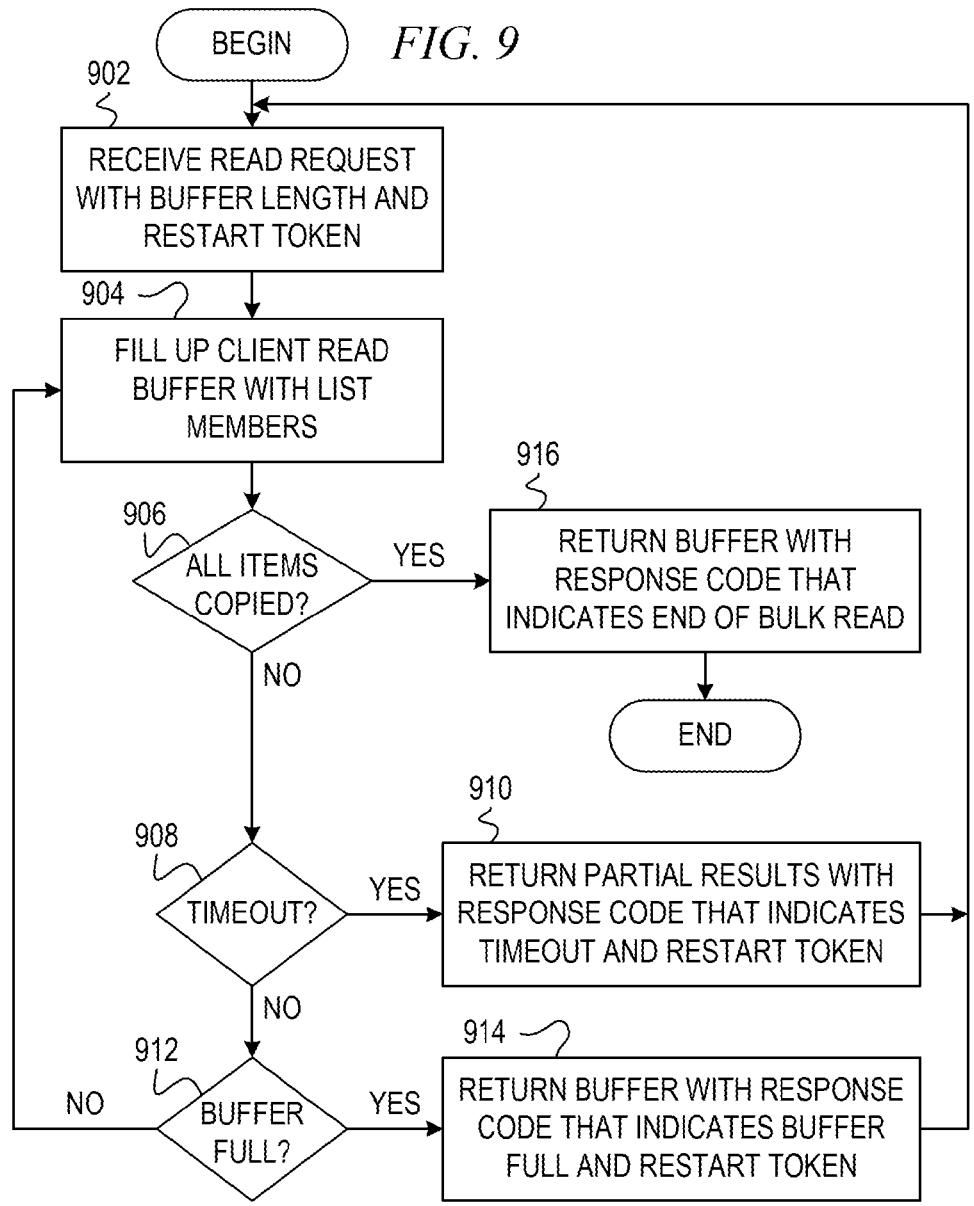

MULTI-PART AGGREGATED VARIABLE IN STRUCTURED EXTERNAL STORAGE

BACKGROUND

The present application relates generally to an improved data processing apparatus and method and more specifically to mechanisms for creating and maintaining multi-part aggregate variables.

Over the years, computer manufacturers have provided processing architectures based on a multi-system shared data approach. Through these architectures, multiple large-scale computer systems, each of which is often referred to as a computer processing complex (CPC) or a central electronic complex (CEC), are interconnected through a shared external storage (SES), which may also be referred to as a shared electronic storage or, a coupling facility, or another interprocessor communication mechanism, to permit each system to gain read/write access to data residing on one or more shared input/output devices. The resulting interconnected computer system is commonly referred to as a sysplex.

A coupling facility (CF), or SES, provides a structured storage for connecting multiple CPCs to allow efficient interchange of data between multiple physical systems while maintaining coherency of the data across all systems. The coupling facility consists of high speed network links, such as Infiniband or Ethernet links, central processing units (CPUs), random access memory (RAM) storage that is accessed by the link adapters and CPUs, and control software running in the CPUs.

A CF structure presents a set of objects maintained on behalf of attaching systems. A structure is similar to a shared file in a direct access storage device (DASD), except that structures are maintained in the coupling facility's storage. The CF receives commands from attached CPCs via the links, executes the commands, and returns responses over the links. The commands may create, write to, read from, update, or delete structures on behalf of the attached CPCs. In response to certain commands, the CF may notify attached CPCs of state changes in certain structure objects. Memory within the CF is categorized as either control storage or non-control storage.

There is an important difference between a CF structure and a shared file. Once a program opens a shared file, it may make arbitrary modifications to any part of the file. A CF structure has a structure to it that cannot be corrupted by an attached client. For example, a list structure contains doubly linked lists. If it were stored in a shared file then a program could corrupt the pointers in a list. But since the structure is stored in a CF and the client can only request high level operations on the structure (such as add, move, or delete list entry) such pointer corruptions are not possible.

In a single node computer system, there are many examples of a number that is kept in global memory to keep track of part of the system state. In an operating system, this might be the number of active processes. In a Web server, this might be the number of current connections. In a transaction-aware middleware, including database management systems, messaging software, and application servers, this might be the log sequence number (LSN) of the oldest uncommitted transaction (known as the commitLSN value).

Within a single node, there are usually many threads updating this number; therefore, it must be protected by a serialization mechanism, such as a latch or a lock. In a multi-node cluster, each member of the cluster may have to know the minimum or maximum value of all of these numbers across of the nodes in the cluster. A single number held in the private memory of one node is no longer enough.

One way to keep all of the members aware of the global minimum or maximum value is to have each member broadcast its value to all of the other members whenever its value changes. This requires serialization within the member for local, updates to the number, combined with a protocol for broadcasting the new local value to all other nodes.

Another way to keep all of the members aware of the global minimum or maximum value is to have all of the members keep their number in a structured external storage. For example, a database may use a CF to maintain the group-wide commit LSN with a protocol that requires multiple messages between each client and the CF. This configuration requires a lock to serialize access to the CF structure. The update sequence comprises obtaining a lock, which itself may require message to the CF, reading the commit LSN structure from the CF, updating this member's commit LSN in the structure, writing the structure back to the CF, releasing the lock, which may require another message to the CF, and storing the new group commit LSN in local storage. This requires acquisition of a global lock plus two round trips to the CF plus a release of the global lock.

When a node joins the cluster, it wants to use the current aggregate value as its starting point. If the aggregate value is stored in a structured external storage, the new node can read the current aggregate value from the structured storage and then write that value back as its own. However, between the read of the aggregate and the write of the member value, the aggregate may change. Therefore, this operation must somehow be serialized.

SUMMARY

In one illustrative embodiment, a method is provided in a data processing system for multi-part aggregate variables in a list structure in shared external storage structures. The method comprises receiving a request to write a value to a multi-part aggregate variable from a first member client and creating a first entry in the list structure. The first entry comprises a primary key identifying the multi-part aggregate variable, a member identifier identifying the first member client, an identification of the aggregate function for the multi-part aggregate variable, and the value being written by the first member client. The method further comprises determining an aggregate value for the multi-part aggregate variable based on the aggregate function for the multi-part aggregate variable and writing the aggregate value for the multi-part aggregate variable in the first entry.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is a flowchart illustrating operation of a shared external storage removing a member from a set of values in a multi-part aggregate variable in a list structure in accordance with an illustrative embodiment;

FIG. 8 is a flowchart illustrating operation of a shared external storage removing a multi-part aggregate variable from a list structure in accordance with an illustrative embodiment;

FIG. 9 is a flowchart illustrating operation of a shared external storage performing a bulk read of multi-part aggregate variables in a list structure in accordance with an illustrative embodiment; and FIG. 10 is a flowchart illustrating operation of a shared external storage performing a bulk insert of multi-part aggregate variable member values in a list structure in accordance with an illustrative embodiment.

DETAILED DESCRIPTION

The illustrative embodiments provide a mechanism for multi-part aggregated variables in structured external storage. The shared external storage provides a serialized, aggregated structure update capability. The shared external storage identifies each local value for which a group value is needed by name. Each time a member writes out its value, the member specifies the name of the object, the member's current value, and the type of aggregate function to apply (e.g., minimum, maximum, etc.). The structured external storage in one atomic operation updates the member's value, recalculates the aggregate of all of the individual values, and returns the aggregate to the member. The advantage of this approach is that it requires only one write operation to the structured external storage. The update operation does not require locking on the part of the client, because the operation is atomic.

In one example embodiment, the shared external storage may achieve atomicity using an internal latching protocol that requires all objects updated by write operations to be exclusively latched until all updates are completed. Then the shared external storage releases all latches after which the objects with the new states are visible. The shared external storage then sends the response to the write operation. This may be referred to as "command concurrency." However, as will be recognized by a person of ordinary skill in the art, other techniques for achieving atomicity may be employed without departing from the spirit and scope of the present invention.

Figure 1:
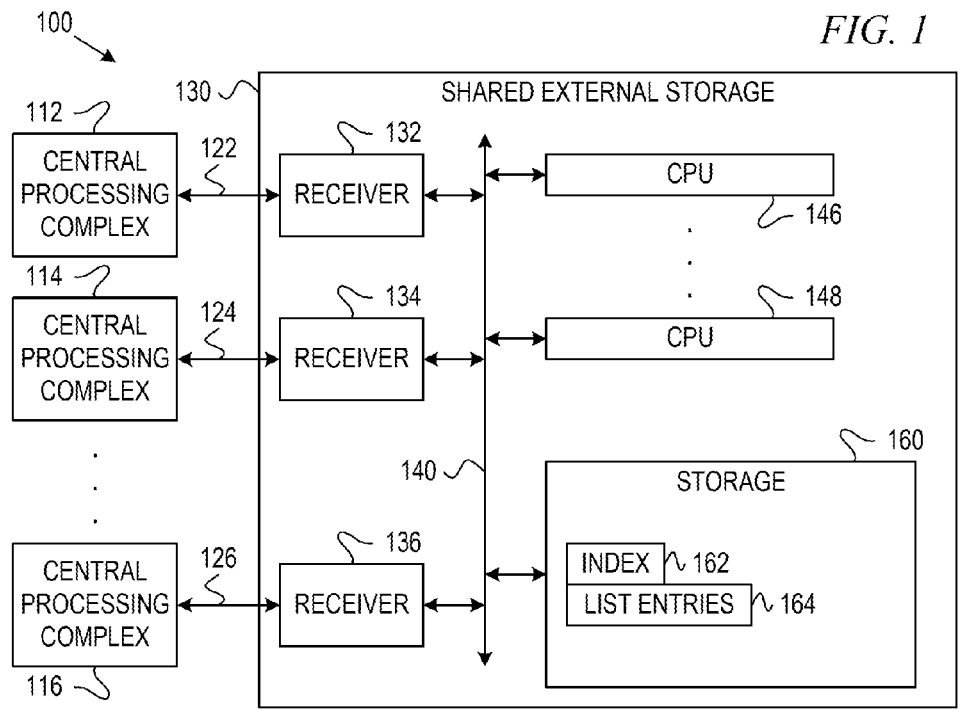
FIG. 1 depicts a pictorial representation of an example distributed data processing system in which aspects of the illustrative embodiments may be implemented.

With reference now to the figures and in particular with reference to FIG. 1, an example diagram of a data processing environment is provided in which illustrative embodiments of the present invention may be implemented. It should be appreciated that FIG. 1 is only an example and is not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. In FIG. 1, the system 100 includes central processing complexes (CPCs) 112-116 interconnected to shared external storage 130 through respective links 122-126. Each central processing complexes 112-116 may be any architecture having links. Each of CPCs 112-116 operates to execute one or more processes that may share data with other ones of the one or more processes executing on the same CPC or a different CPC. The sharing of data by two or more processes is carried out through operation of shared external storage 130.

The shared external storage (SES) 130 includes one or more central processing units (CPUs) 146, 148 and storage 160. SES 130 includes receivers 132-136 that connect to respective ones of links 122-126.

The receivers 132-136, the CPUs 146, 148, and storage 160 interconnect via bus 140. Storage 160 may be, for example, a large storage of data. For instance, storage 160 may be a random access memory (RAM), a flash memory, or some other storage.

Although not illustrated in FIG. 1, storage 160 may store control code for controlling the setup and operation of SES 130, information indicating the locations in storage that are free and hence available for allocation, and one or more work and completion queues for operations to be performed by CPCs 112-116.

Returning to FIG. 1, according to one illustrative embodiment, SES 130 provides multi-part aggregated variables. SES 130 stores the multi-part aggregated variables in list entries 164, which are indexed using index 162. SES 130 identifies each local value for which a group value is needed by name. Each time a member writes out its value, the member specifies the name of the object, the member's current value, and the type of aggregate function to apply (e.g., minimum, maximum, etc.). SES 130, in one atomic operation, updates the member's value, recalculates the aggregate of all of the individual values, and returns the aggregate to the member. The advantage of this approach is that it requires only one write operation to the structured external storage. The update operation does not require locking on the calling side, because the operation is atomic.

Figure 2:
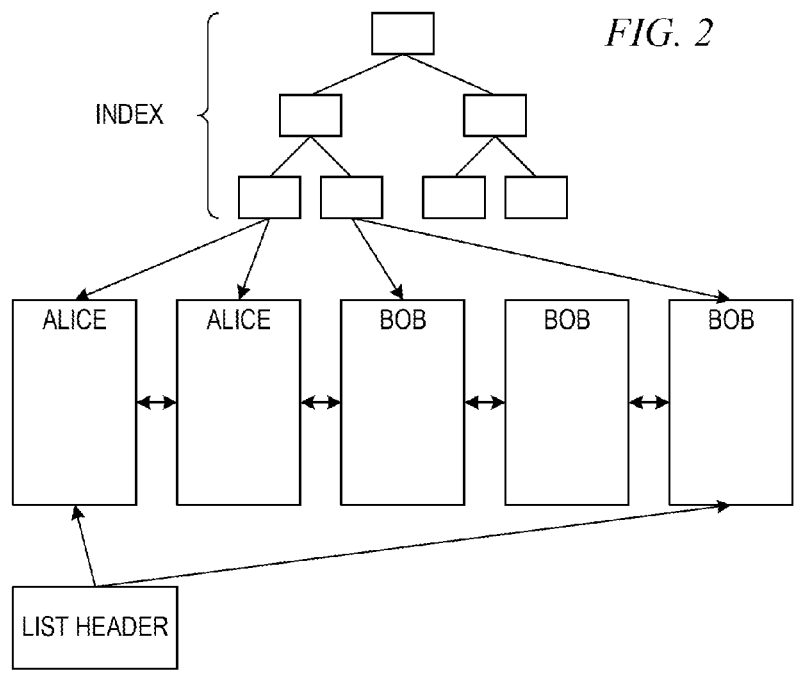
FIG. 2 depicts an example list data structure in a shared external storage in accordance with an illustrative embodiment.

FIG. 2 depicts an example list data structure in a shared external storage in accordance with an illustrative embodiment. Each list entry has a primary key. The in-memory index indexes each entry by primary key, which can be used to directly locate either the first or the last entry in the list with a given primary key. That is, the index, for a given primary key, points to the first entry and the last entry for the variable corresponding to the primary key. The list header points to the first entry and the last entry in the entire list. Each entry also includes a forward and backward pointer to point to the next and previous entry, respectively.

In the depicted example, the list structure has two primary keys: "Alice" and "Bob." Two list entries have a primary key of "Alice," and three list entries have a primary key of "Bob," Primary keys may be sixteen byte opaque values, for example. Primary keys are not usually human readable strings, although they may be. The primary keys are shown to be human readable strings in FIG. 2 for illustrative purposes.

In accordance with the illustrative embodiment, the shared external storage provides a serialized, aggregated structure update capability on top of the list structure shown in FIG. 2. The shared external storage identifies each local value for which a group value is needed by name. Each time a member writes out its value, the member specifies the name of the object, the member's current value, and the type of aggregate function to apply (e.g., minimum, maximum, etc.).

Figure 3:
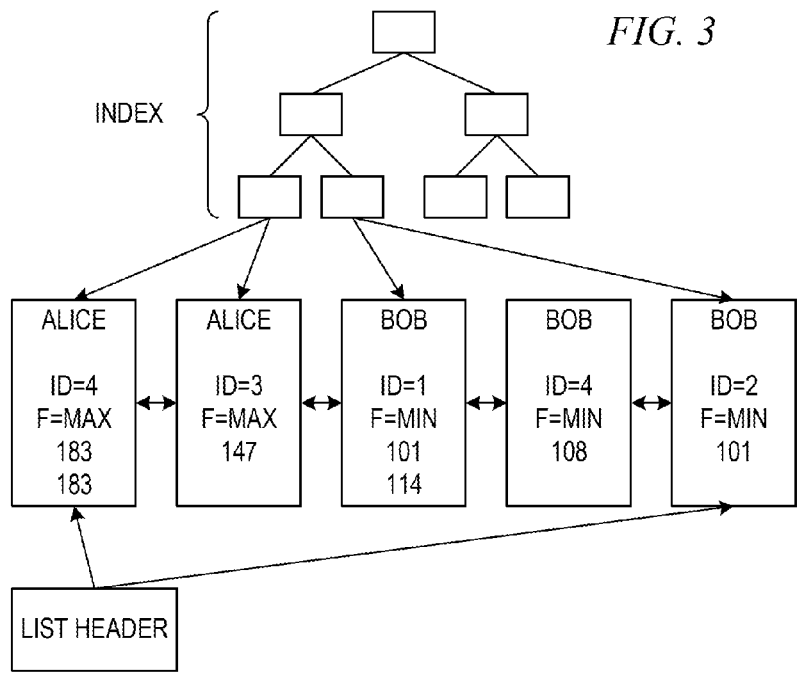
FIG. 3 depicts an example multi-part aggregated variable in a list structure in a shared external storage in accordance with an illustrative embodiment.

FIG. 3 depicts an example multi-part aggregated variable in a list structure in a shared external storage in accordance with an illustrative embodiment. Each variable has up to one entry per connected client. In this case, there are two multi-part aggregated variables: "Alice" and "Bob." Each entry is represented by a list entry. The name of the variable is the primary key, and the shared external storage (SES) uses the primary key index to locate the first entry for each variable.

Each entry holds the name of the variable, the identification (ID) of the member whose value is represented, the type of aggregate function, and the value for that member. The aggregate function may be for example, minimum (ruin), maximum (max), average (avg), etc. The first entry for a given variable also holds the aggregate value for the variable itself. The variable "Alice" has two member values and an aggregate value. The variable "Bob" has three values and an aggregate value.

In variable "Alice," the value for member 4 is 183, and the value for member 3 is 147. Because the aggregate function for "Alice" is "maximum," the first entry for "Alice" holds an aggregate value of 183, which is the maximum of 183 and 147.

In variable "Bob," the value for member 1 is 114, the value for member 4 is 108, and the value for member 2 is 101. The aggregate function for "Bob" is "minimum." Therefore, the aggregate value is 101, because the minimum of 101, 108, and 114 is 101. The aggregate value is stored in the first entry for "Bob."

Figure 4A:
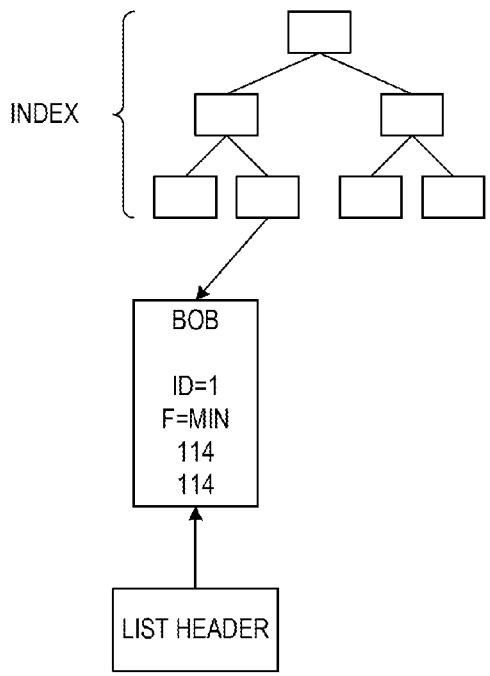
FIGS. 4A-4C depict a process of creating multi-part aggregate variable entries in a list structure in a shared external storage in accordance with an illustrative embodiment.
Figure 4B:
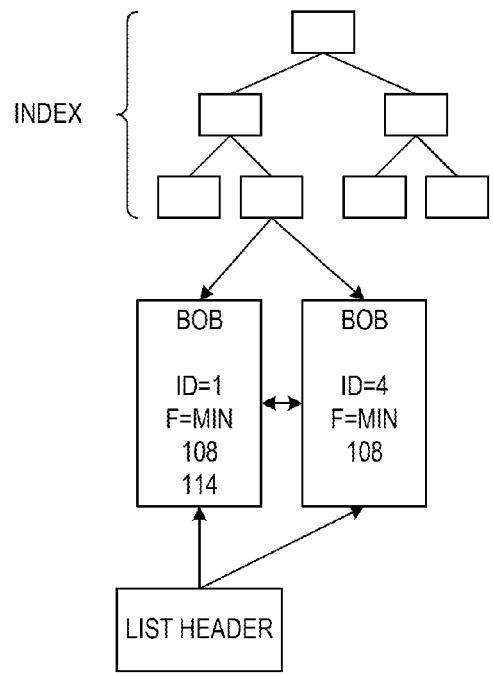
Figure 4C:
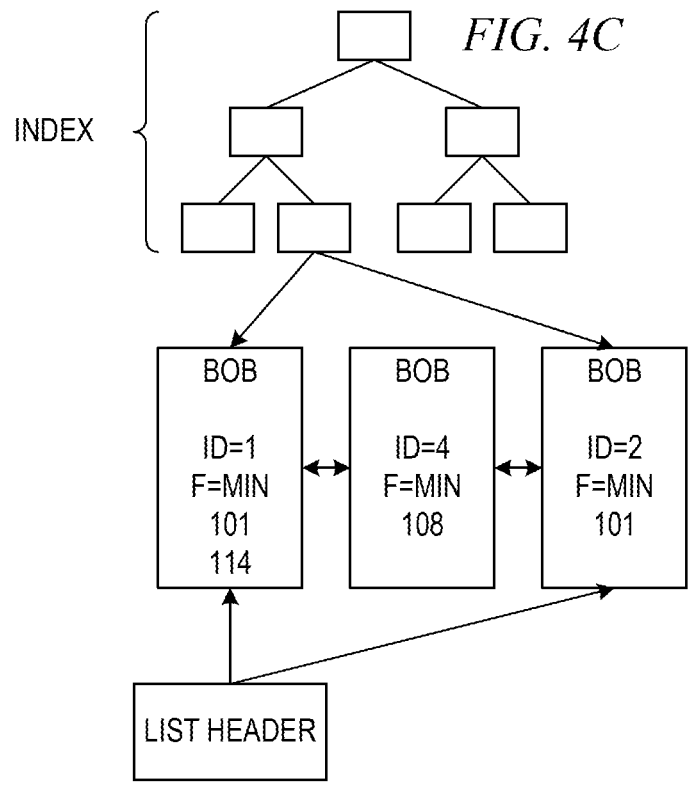

FIGS. 4A-4C depict a process of creating multi-part aggregate variable entries in a list structure in a shared external storage in accordance with an illustrative embodiment. The shared external storage (SES) creates a new list entry when a client (attached member) writes out a value for a name (primary key) that does not yet exist. The SES looks up the name by primary key, discovers that it does not yet exist, and adds it to the list. Because this new entry is the only entry, the aggregate value is the same as the sole member value. FIG. 4A depicts an example of creating a new multi-part aggregate variable in accordance with an example embodiment. Member 1 writes value 114 for the variable "Bob." The first entry is the only entry; therefore, the aggregate value is also 114. The SES updates the index such that the primary key "Bob" points to this entry, which is the first and last entry for the variable "Bob." The SES also updates the list header to point to this entry, because the entry is the first and last entry in the entire list in the depicted example.

FIG. 4B depicts an example of updating a multi-part aggregate variable in accordance with an example embodiment. The SES updates a multi-part aggregate variable when a member writes a new value for an existing multi-part aggregate variable. That is, updating a multi-part aggregate variable may include writing a new value for a new member or overwriting an existing value for an existing member. In the depicted example, member 4 writes a value of 108 for the variable "Bob." Because 108 is less than 114 and the aggregate function is "minimum" for the variable "Bob," the SES changes the aggregate value in the first entry from 114 to 108. The SES also updates the index such that the primary key "Bob" points to the first entry and the last entry and updates the list header to point to the first entry and the last entry in the list structure.

FIG. 4C depicts a further example of updating a multi-part aggregate variable in accordance with an example embodiment. In the depicted example, member 2 writes a value of 101 for the variable "Bob." Because 101 is less than 108, the SES changes the aggregate value in the first entry from 108 to 101.

To accomplish these updates, the SES looks up the entry by primary key in the index, discovers that at least one entry already exists, and looks for the member's entry. If the member has no entry, the SES creates a new entry. If the member already has an entry, the SES overwrites the entry with the new value. Whenever a value is created or overwritten, the SES updates the aggregate value in the first entry.

In accordance with an example embodiment, the member may be required to tell the SES if it intends to create a new entry for itself. If a member tells the SES that it is creating a new entry, then the SES rejects the write if an entry already exists for the member. If the member tells the SES that it is overwriting an existing entry, then the SES rejects the write if the entry does not already exist. Thus, the SES may improve the performance of certain latching operations if it knows at the beginning of the operation if it will be creating a new entry.

Furthermore, a member may request to have its value removed from the set of values for the multi-part aggregate variable. If member 2 in FIG. 4C asks to have its value deleted, then the list structure reverts to the state shown in FIG. 4B.

A member may also ask to have an entire multi-part aggregate variable deleted. When a member asks to delete an entire multi-part aggregate variable, every member value is deleted and the multi-part aggregate variable no longer exists.

A member may request to read all of the values of all multi-part aggregate variables contained in an entire list structure, which may be referred to as a bulk read. The SES may use a repeated series of read operations and transfer buffers full of multi-part aggregate variable values to the client until all of the values in the list structure have been read or until the member stops reading.

A member may also request to perform a bulk insert of an entire set of multi-part aggregate variables with values from many members. This is the inverse of the bulk read operation described above. The intent of the bulk read and bulk insert may be to allow a member to copy an entire set of multi-part aggregate variables from one list structure to another. If the two list structures reside in two different SES devices, then this may copy all of the values from one SES to another.

The list structure may contain a number of different lists. While the embodiments described above store all multi-part aggregate variables in one list, the SES may distribute the multi-part aggregate variables across a number of lists by hashing the name to select the list. This reduces contention on the list latch by spreading the data over a number of lists and, thus, a number of list latches.

Figure 5:
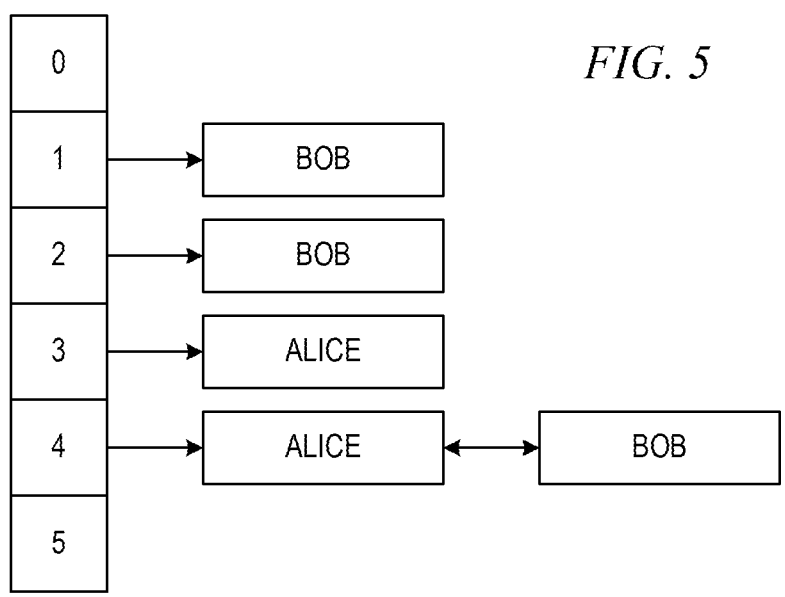
FIG. 5 depicts a member list for multi-part aggregate variables in a list structure in a shared external storage in accordance with an illustrative embodiment.

FIG. 5 depicts a member list for multi-part aggregate variables in a list structure in a shared external storage in accordance with an illustrative embodiment. The shared external storage (SES) stores a list for each member that has any interest in any multi-part variable. FIG. 3 shows two smart array variables, "Alice" and "Bob," with value contributions from four different members. FIG. 5 illustrates the associated interest lists, one per member. The interest list for member 1 shows that it has contributed values only to the variable "Bob." The interest list for member 4 shows that it has contributed values to both "Alice" and "Bob,"

Although not shown in FIG. 5, the list header for each list points to both the first and East entry in each list. FIG. 5 also shows that the interest list for member 1 is list 1, the list for member 2 is list 2, and so forth. However, the interest list for a member can be any list number, or any other representation, as long as there is a known mapping between member number and list number.

If interest lists are in use, the SES maintains the interest lists automatically. However, the SES does not do any automatic cleanup if a member crashes. The SES is generally unaware of member failures. Post crash cleanup is left to the individual members to perform. A member may clean up after itself after restarting, or one surviving member may perform cleanup on behalf of a failed member.

If a member crashes, cleanup may be performed on its values in all or some of the variables. The cleanup may be performed by the member itself after it restarts or may be performed by some other member on its behalf. The member doing the cleanup may read the interest list of the failed member to discover the names of all of the variables to which the failed member has contributed values.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or, other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 6:
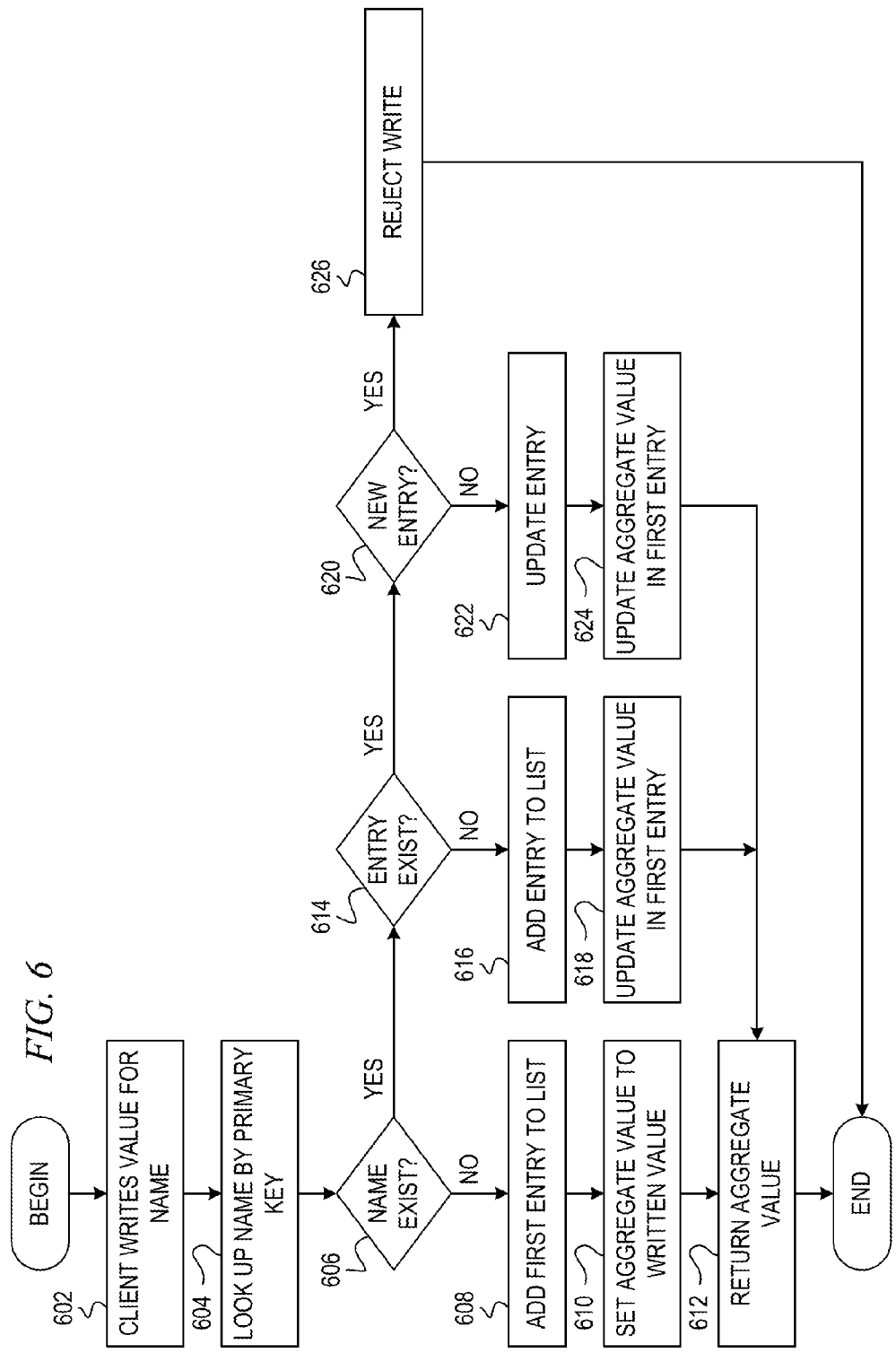
FIG. 6 provides a flowchart outlining example operations of a shared external storage creating and updating multi-part aggregate variable entries in a list structure in accordance with an illustrative embodiment.

FIG. 6 provides a flowchart outlining example operations of a shared external storage creating and updating multi-part aggregate variable entries in a list structure in accordance with an illustrative embodiment. Operation begins, and a client requests a write for a given multi-part aggregate variable name (block 602). The shared external storage (SES) looks up the variable name by primary key (block 604) and determines whether a multi-part aggregate variable by the name exists (block 606).

If the SES determines that a multi-part aggregate variable by the name does not exist, the SES adds a first entry to the list structure identifying the primary key, the ID of the member, the aggregate function, and the value being written (block 608). The SES then sets the aggregate value to the written value in this first entry (block 610). The SES returns the aggregate value to the client (block 612). Thereafter, operation ends.

If the SES determines that a multi-part aggregate variable by the name does exist in block 606, the SES determines whether an entry for the requesting member exists (block 614). If the SES determines that an entry for the member does not exist, the SES adds an entry for the member to the list identifying the primary key, the ID of the member, the aggregate function, and the value being written (block 616). The SES then updates the aggregate value in the first entry for the multi-part aggregate variable (block 618). Then, operation proceeds to block 612 and the SES returns the aggregate value to the client. Thereafter, operation ends.

If the SES determines that a multi-part aggregate variable by the name does exist in block 614, the SES determines whether the request is for creation of a new entry (block 620). If the SES determines that the request is not for creation of a new entry, i.e. the request is for overwriting an existing entry, then the SES updates the entry with the written value for the multi-part aggregate variable (block 622) and updates the aggregate value in the first entry (block 624). Then, operation proceeds to block 612 and the SES returns the aggregate value to the client. Thereafter, operation ends. If the SES determines that the request is for creation of a new entry in block 620, the SES rejects the write (block 626), and operation ends.

FIG. 7 is a flowchart illustrating operation of a shared external storage removing a member from a set of values in a multi-part aggregate variable in a list structure in accordance with an illustrative embodiment. Operation begins, and the SES receives a request to remove a member from a set of values in a multi-part aggregate variable in a list structure (block 702). The SES removes the member from the set of values (block 704). Removing the member from the set of values may comprise updating a forward pointer of a previous entry to point to the next entry and/or updating the backward pointer of a next entry to point to the previous entry. Removing the member from the set of values may also comprise updating the index if the member is the first or last entry in the set of values and/or updating the list header if the member is the first or last entry in the list structure. Then, the SES updates the aggregate value in the first entry for the multi-part aggregate variable (block 706) and returns the aggregate value to the client (block 708). Thereafter, operation ends.

FIG. 8 is a flowchart illustrating operation of a shared external storage removing a multi-part aggregate variable from a list structure in accordance with an illustrative embodiment. Operation begins, and the SES receives a request to remove a multi-part aggregate variable from the list structure (block 802). The SES removes all members having an entry for the multi-part aggregate variable in the list structure (block 804). Thereafter, operation ends.

FIG. 9 is a flowchart illustrating operation of a shared external storage performing a bulk read of multi-part aggregate variables in a list structure in accordance with an illustrative embodiment. Operation begins, and the SES receives a read request with a buffer length and restart token from a client (block 902). The client passes a read buffer length to the SES. The read buffer length may be 64K, for example, but could be smaller or greater depending upon the implementation. The client also passes a restart token that indicates how far the read has progressed. A restart token of all zeros indicates that the read request is the first request. The SES begins to fill up the client read buffer with list members (block 904). Then, the SES determines whether all items of the list are copied to the read buffer (block 906).

If the SES determines that not all items of the list are copied to the read buffer, the SES determines whether a timeout condition occurs (block 908). A timeout condition may occur, for example, when a model dependent time period has elapsed. All SES commands are to complete in a short time period because the client operating system is stalled waiting for a response. Therefore, commands such as bulk reads may timeout and return partial results requiring the client to continue issuing read requests. If the SES determines that a timeout condition occurs, the SES returns partial results with the restart token and a response code indicating that a timeout occurred (block 910). The restart token is an opaque value that may be between eight to sixteen bytes in length. A restart token of all zeros indicates that the read request is the first request, and anything else must be returned unaltered to the SES on the next read. Thereafter, operation returns to block 902 to receive the next read request from the client.

If the SES determines that a timeout condition does not occur in block 908, the SES determines whether the read buffer is full (block 912). If the read buffer is not full, operation returns to block 904 to continue filling up the client read buffer with list members. If the buffer is full in block 912, the SES returns the buffer with the restart token and a response code that indicates that the buffer is full (block 914). Thereafter, operation returns to block 902 to receive the next read request form the client.

Returning to block 906, if all of the items have been copied, the read is complete. The SES then returns the buffer with a response code indicating the end of the bulk read (block 916). Thereafter, operation ends.

FIG. 10 is a flowchart illustrating operation of a shared external storage performing a bulk insert of multi-part aggregate variable member values in a list structure in accordance with an illustrative embodiment. Operation begins, and the SES receives a buffer of write values and an index (block 1002). The buffer may be 64K, for example, but could be smaller or greater depending upon the implementation. The SES writes values to the list structure, as described above with reference to FIG. 6, from the buffer starting at a point indicated by the index (block 1004).

The SES determines whether a timeout condition exists (block 1006). A timeout condition may occur, for example, when a model dependent time period has elapsed. All SES commands are to complete in a short time period because the client operating system is stalled waiting for a response. Therefore, commands such as bulk writes may timeout with partial results requiring the client to continue issuing write requests. If the SES determines that a timeout condition occurs, the SES returns a response code indicating that it could not complete all of the inserts and an index to the buffer to tell the client how far the SES progressed with the bulk write (block 1008). Thereafter, operation ends. If a timeout condition does not occur in block 1006, the SES returns a response code indicating that the write is complete (block 1010). Thereafter, operation ends.

The client may continue to request write operations until all of the writes complete. That is, the operation illustrated in FIG. 10 may repeat until the SES completes the bulk write (insert). On each bulk write, the client sends not only the buffer full of values but also the index within the buffer at which the SES is to start writing the values to the list structure. If, for example, the client sends 100 values and the SES can only write 50 values, then the client may send the same buffer with an index of 50 on the next write request. Alternatively, the client may reformat the buffer with the 50 leftover values and 50 new values and send another write request with an index of 0 to tell the SES to start at the beginning of the buffer.

The flowcharts of FIGS. 9 and 10 may be combined to form a bulk move or bulk copy. Clients may use a bulk move or bulk copy for duplexing, also referred to as mirroring. That is, a client may write to two SES devices concurrently for failover if one of the SES devices fails. If a SES fails and the failed SES is replaced, the client may copy the list structure from the surviving SES to the replacement SES to restore mirroring. Thus, to perform a bulk copy, the client may perform a bulk read from the source SES, as shown in FIG. 9, and a bulk write to the destination SES, as shown in FIG. 10.

There may be other instances where a client may wish to move a list structure from one SES to another SES. For example, a client may move a list structure from a SES that is about to undergo maintenance to a temporary or permanent replacement SES device. As another example, a client may perform a bulk move for a planned upgrade. Thus, to perform a bulk move, the client may perform a bulk read from the source SES, as shown in FIG. 9, removing the members as they are read, as shown in FIG. 7, and a bulk write to the destination SES, as shown in FIG. 10.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for multi-part aggregated variables in structured external storage. The shared external storage provides a serialized, aggregated structure update capability. The shared external storage identifies each local value for which a group value is needed by name. Each time a member writes out its value, the member specifies the name of the object, the member's current value, and the type of aggregate function to apply (e.g., minimum, maximum, etc.). The structured external storage in one atomic operation updates the member's value, recalculates the aggregate of all of the individual values, and returns the aggregate to the member. The advantage of this approach is that it requires only one write operation to the structured external storage. The update operation does not require locking, because the operation is atomic.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a shared external storage device, for multi-part aggregate variables in shared external storage structures, the method comprising:

receiving, by the shared external storage device, a request to write a value to a multi-part aggregate variable from a first member client;

creating, by the shared external storage device, a first entry, wherein the first entry comprises a primary key identifying the multi-part aggregate variable, a member identifier identifying the first member client, an identification of an aggregate function for the multi-part aggregate variable, and the value being written by the first member client;

determining, by the shared external storage device, an aggregate value for the multi-part aggregate variable based on the aggregate function for the multi-part aggregate variable;

writing, by the shared external storage device, the aggregate value for the multi-part aggregate variable in a predetermined entry for the multi-part aggregate variable; and returning the aggregate value to the first member client.

2. The method of claim 1, wherein the method is performed as one atomic operation.

3. The method of claim 1, wherein the shared external storage structures comprise an index that indexes the list structure, the method further comprising:

updating the index such that for the primary key, the index points to the first entry as a first entry of the multi-part aggregate variable.

4. The method of claim 1, further comprising:
updating a list header to point to the first entry as a first entry in the list structure.

5. The method of claim 1, further comprising:
receiving a request to write a subsequent value to the multi-part aggregate variable from a second member client;
creating a second entry, wherein the second entry comprises the primary key identifying the multi-part aggregate variable, a member identifier identifying the second member client, the identification of the aggregate function for the multi-part aggregate variable, and the subsequent value being written by the second member client;
determining a new aggregate value for the multi-part aggregate variable based on the aggregate function for the multi-part aggregate variable, the value written by the first member client, and the subsequent value written by the second member client;
writing the new aggregate value for the multi-part aggregate variable in the predetermined entry; and
returning the new aggregate value to the second member client.

6. The method of claim 5, wherein the shared external storage comprises an index that indexes the list structure, the method further comprises:
updating the index such that for the primary key the index points to the first entry as a first entry of the multi-part aggregate variable and points to the second entry as a last entry of the multi-part aggregate variable.

7. The method of claim 5, wherein the request to write the subsequent value is a request to create a new entry for the second member client, the method further comprising:
determining whether an entry exists for the second member client in the list structure for the multi-part aggregate variable; and
responsive to an entry already existing for the second member client in the list structure for the multi-part aggregate variable, rejecting the request to write the subsequent value.

8. The method of claim 1, further comprising:
receiving a request to update a value of the multi-part aggregate variable for a given member client;
determining whether an entry exists for the given member client in the list structure for the multi-part aggregate variable;
responsive to an entry not existing for the given member for the multi-part aggregate variable, creating a second entry, wherein the second entry comprises the primary key identifying the multi-part aggregate variable, a member identifier identifying the second member client, the identification of the aggregate function for the multi-part aggregate variable, and the subsequent value being written by the second member client;
determining a new aggregate value for the multi-part aggregate variable based on the aggregate function for the multi-part aggregate variable, the value written by the first member client, and the subsequent value written by the second member client;
writing the new aggregate value for the multi-part aggregate variable in the predetermined entry; and
returning the new aggregate value to the given member client.

9. The method of claim 8, further comprising:
responsive to an entry existing for the given member for the multi-part aggregate variable, updating the existing entry to overwrite the value with the value being written by the given member client;
determining a new aggregate value for the multi-part aggregate variable based on the aggregate function for the multi-part aggregate variable;
writing the new aggregate value for the multi-part aggregate variable in the predetermined entry; and
returning the new aggregate value to the given member client.

10. The method of claim 1, further comprising:
receiving a request to remove an entry for the multi-part aggregate variable from a given member client;
removing an entry of the given member client;
determining a new aggregate value for the multi-part aggregate variable;
writing the new aggregate value for the multi-part aggregate variable in the predetermined entry for the multi-part aggregate variable; and
returning the new aggregate value to the given member client.

11. The method of claim 1, wherein the aggregate function comprises a minimum function, a maximum function, or an average function.

12. The method of claim 1, further comprising:
receiving a bulk read request from a requesting client;
reading multi-part aggregate variable values from the list structure to a read buffer;
returning contents of the read buffer to the requesting client; and
repeating receiving a bulk read request, reading multi-part aggregate variables to the read buffer, and returning contents of the read buffer until all items are read.

13. The method of claim 12, wherein the bulk read request comprises a buffer length and wherein the read buffer has a length equal to the buffer length.

14. The method of claim 12, further comprising:
responsive to a timeout condition, returning partial results with a response code that notifies the requesting client of the timeout condition and a restart token that indicates how far into the bulk read the shared external storage device progressed.

15. The method of claim 12, further comprising:
responsive to filling the read buffer, returning contents of the read buffer with a response code that notifies the requesting client that the buffer is full.

16. The method of claim 1, further comprising:
receiving a bulk write request comprising a write butler of write values; and
writing values from the write buffer to the shared external storage.

17. A computer program product comprising a non-transitory computer readable storage medium having a computer readable program stored therein, wherein the computer readable program, when executed on a computing device, causes the computing device to:
receive a request to write a value to a multi-part aggregate variable from a first member client;
create a first entry, wherein the first entry comprises a primary key identifying the multi-part aggregate variable, a member identifier identifying the first member client, an identification of an aggregate function for the multi-part aggregate variable, and the value being written by the first member client;
determine an aggregate value for the multi-part aggregate variable based on the aggregate function for the multi-part aggregate variable;
write the aggregate value for the multi-part aggregate variable in a predetermined for the multi-part aggregate variable; and
return the aggregate value to the first member client.

18. The computer program product of claim 17, wherein the computer readable program is stored in a computer readable storage medium in a data processing system and wherein the computer readable program was downloaded over a network from a remote data processing system.

19. The computer program product of claim 17, wherein the computer readable program is stored in a computer readable storage medium in a server data processing system and wherein the computer readable program is downloaded over a network to a remote data processing system for use in a computer readable storage medium with the remote system.

20. An apparatus, comprising:
   a processor; and
   a memory coupled to the processor, wherein the memory comprises instructions which, when executed by the processor, cause the processor to:
   receive a request to write a value to a multi-part aggregate variable from a first member client;
   create a first entry, wherein the first entry comprises a primary key identifying the multi-part aggregate variable, a member identifier identifying the first member client, an identification of an aggregate function for the multi-part aggregate variable, and the value being written by the first member client;
   determine an aggregate value for the multi-part aggregate variable based on the aggregate function for the multi-part aggregate variable;
   write the aggregate value for the multi-part aggregate variable in a predetermined entry for the multi-part aggregate variable; and
   return the aggregate value to the first member client.

* * * * *